(12) United States Patent
Yuchas et al.

(10) Patent No.: US 12,019,763 B2
(45) Date of Patent: Jun. 25, 2024

(54) SYSTEMS AND METHODS FOR DE-IDENTIFYING DATA USING A COMBINATION OF CRYPTOGRAPHIC TECHNIQUES

(71) Applicant: Disney Enterprises, Inc., Burbank, CA (US)

(72) Inventors: Matthew W. Yuchas, Katy, TX (US); Benjamin Israelson, Kirkland, WA (US); Gregory Clayton, Orlando, FL (US); Steven Maltby, Kissimmee, FL (US)

(73) Assignee: Disney Enterprises, Inc., Burbank, CA (US)

( * ) Notice: Subject to any disclaimer, the term of this patent is extended or adjusted under 35 U.S.C. 154(b) by 266 days.

(21) Appl. No.: 17/456,592

(22) Filed: Nov. 26, 2021

(65) Prior Publication Data

US 2023/0169184 A1    Jun. 1, 2023

(51) Int. Cl.
*G06F 21/60* (2013.01)
*G06F 21/62* (2013.01)
(Continued)

(52) U.S. Cl.
CPC ........ *G06F 21/602* (2013.01); *G06F 21/6254* (2013.01); *H04L 9/0643* (2013.01); *H04L 9/0869* (2013.01)

(58) Field of Classification Search
CPC . G06F 21/602; G06F 21/6254; H04L 9/0643; H04L 9/0869; H04L 9/3239; H04L 9/00; H04L 2209/42
See application file for complete search history.

(56) References Cited

U.S. PATENT DOCUMENTS 6,363,152 B1 *   3/2002  Cornelius ............. H04L 9/0656
                                                      713/168
2010/0262542 A1 * 10/2010 Kranzley ........... G06Q 20/3226
                                                      705/44
(Continued)

FOREIGN PATENT DOCUMENTS

CN         111460475 A     7/2020

OTHER PUBLICATIONS

Singh et al., "Enhancement of Sha-512 Using Salt, Tree and Permutation", About Mewar University, [retrieved on Oct. 12, 2023], from the Internet: <URL: https://www.researchgate.net/publication/338224023_Proceeding_CASE2012> (Year: 2012).*

*Primary Examiner* — Philip J Chea
*Assistant Examiner* — Sangseok Park
(74) *Attorney, Agent, or Firm* — Onyx IP Group

(57) ABSTRACT

In some implementations, a device may provide a data structure storing first data, wherein the first data indirectly identifies second data, and wherein the second data identifies a particular individual. The device may obtain, from the data structure, the first data. The device may generate a cryptographically random value using a secure generator. The device may combine the first data and the cryptographically random value to generate hashing input data. The device may perform, using a hashing algorithm, a hashing operation on the hashing input data to generate de-identified first data, wherein re-identification of the de-identified first data requires knowledge of at least the first data, the cryptographically random value, and the de-identified first data. The device may perform an action using the de-identified first data.

20 Claims, 13 Drawing Sheets

(51) Int. Cl.
 H04L 9/06  (2006.01)
 H04L 9/08  (2006.01)

(56) References Cited

U.S. PATENT DOCUMENTS

| | | | |
|---|---|---|---|
| 2014/0359763 A1* | 12/2014 | Black | H04W 12/126 |
| | | | 726/22 |
| 2016/0294818 A1* | 10/2016 | Badam | G06F 21/602 |
| 2017/0161521 A1 | 6/2017 | Fontecchio | |
| 2021/0012883 A1 | 1/2021 | Bidulock et al. | |
| 2022/0179973 A1* | 6/2022 | Swenson | H04L 9/32 |
| 2022/0343015 A1* | 10/2022 | Shahin | H04L 9/0643 |

\* cited by examiner

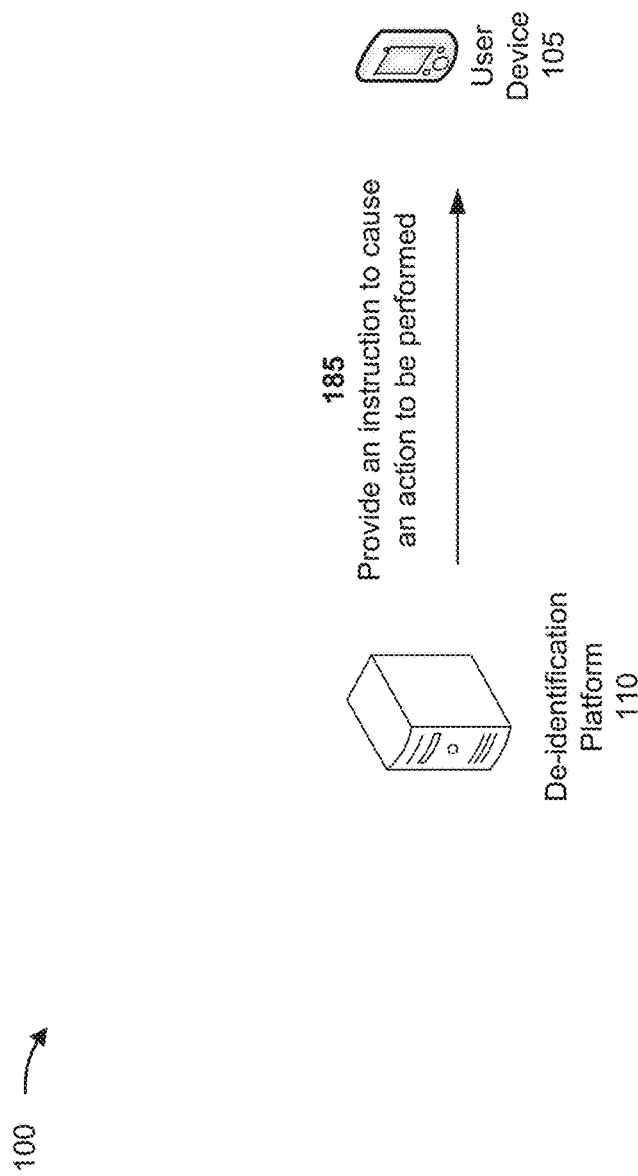

SYSTEMS AND METHODS FOR DE-IDENTIFYING DATA USING A COMBINATION OF CRYPTOGRAPHIC TECHNIQUES

BACKGROUND

Cryptography includes one or more information security techniques that are used to secure information in order to prevent the information from being accessed or tampered with by an unauthorized party. For example, in the field of cryptography, encryption is a process of transforming information to help ensure confidentiality and integrity.

SUMMARY

In some implementations, a method performed by a device includes providing a data structure storing first data, wherein the first data indirectly identifies second data, and wherein the second data identifies a particular individual, obtaining, from the data structure, the first data; generating a cryptographically random value using a secure generator; combining the first data and the cryptographically random value to generate hashing input data; performing, using a hashing algorithm, a hashing operation on the hashing input data to generate de-identified first data, wherein re-identification of the de-identified first data requires knowledge of at least the first data, the cryptographically random value, and the de-identified first data; and performing an action using the de-identified first data.

In some implementations, a device includes one or more processors configured to: obtain, from a first data structure, first data that indirectly identifies second data, wherein the second data indicates an identity of a particular individual, wherein the first data includes inferred identity information that infers the identity and historical data generated by one or more devices used by the particular individual; obtain a cryptographically random value generated using a secure generator; perform, using a hashing algorithm, a hashing operation on a combination of the first data and the cryptographically random value to generate de-identified first data, wherein re-identification of the de-identified first data requires knowledge of at least the first data, the cryptographically random value, and the de-identified first data; and store, in a second data structure, the de-identified first data.

In some implementations, a non-transitory computer-readable medium storing a set of instructions includes one or more instructions that, when executed by one or more processors of a device, cause the device to: obtain, from a first data structure, first data that indirectly identifies second data, wherein the second data indicates an identity of a particular individual, wherein the first data includes inferred identity information that infers the identity and historical data generated by one or more devices used by the particular individual; obtain a cryptographically random value generated using a secure generator; combine the first data and the cryptographically random value to generate hashing input data; perform, using a hashing algorithm, a hashing operation on the hashing input data to generate de-identified first data; and store the de-identified first data in a second data structure.

BRIEF DESCRIPTION OF THE DRAWINGS

FIGS. 1A-1I are diagrams of an example associated with de-identifying data using a combination of cryptographic techniques.

DETAILED DESCRIPTION OF PREFERRED EMBODIMENTS

Figure 1A:
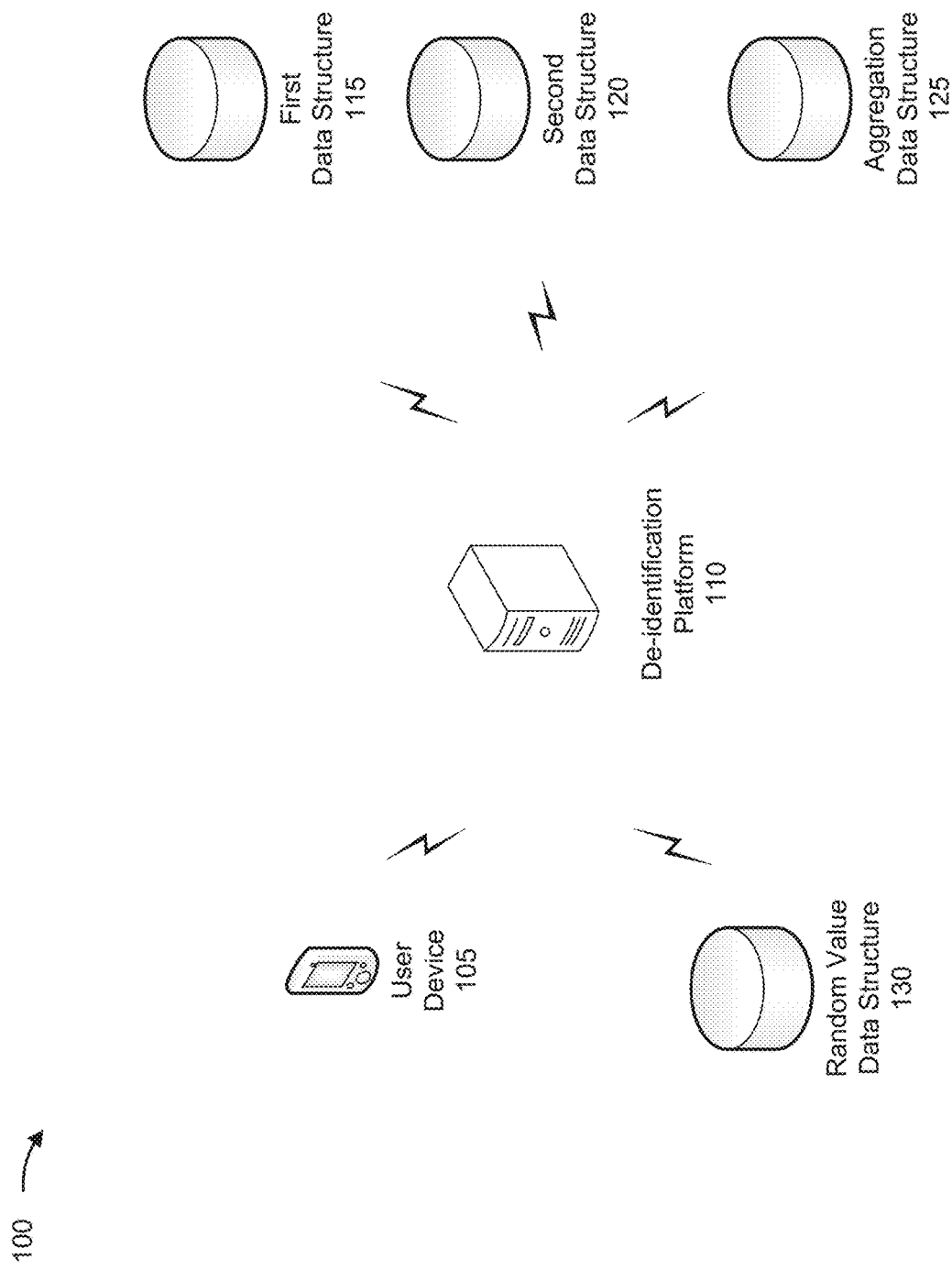

The following detailed description of example implementations refers to the accompanying drawings. The same reference numbers in different drawings may identify the same or similar elements.

Personal identifiable information (PI) may be unique to an individual and, accordingly, may be used to directly determine an identity of the individual. PI may include a social security number of the individual, a passport number of the individual, a driver's license of the license of the individual, among other examples. Unlike PI, indirect PI may be shared by multiple individuals. Accordingly, indirect PI alone may not be used to directly determine the identity of the individual. Indirect PI may include a place of birth of the individual, a business telephone number of the individual, a race of the individual, among other examples.

Indirect PI may be provided by the individual as part of one or more transactions conducted by the individual using one or more devices. While the indirect PI may not be used to directly determine the identity of the individual, the indirect PI should be cryptographically altered in order to de-identify the indirect PI. "De-identify," as used herein, may refer to dissociating or otherwise removing any correlation with the identity of the individual. For example, "de-identify" may refer to a de-identification process to prevent the identity of the individual from being determined (or revealed). De-identifying the indirect PI may prevent a likelihood of the indirect PI being accessed by an unauthorized party and being used (e.g., in combination with other information) to determine the identity of the individual. In this regard, the indirect PI may be cryptographically altered, using a cryptography technique, to de-identify the indirect PI.

In some situations, cryptographically altering the indirect PI may generate different values for the indirect PI. Accordingly, the different values may negatively affect (e.g., alter) a referential integrity associated with the indirect PI (e.g., alter a referential integrity of data associated with the indirect PI). Altering the referential integrity in this manner may waste computer resources, network resources, and other resources associated with taking remedial actions to restore and maintain the referential integrity.

Implementations described herein are directed to de-identifying inferred identity information of a particular individual. "Inferred identity information," as used herein, may refer to indirect PI. In some examples, a device may obtain first data from a data structure. The first data may indirectly identify second data that identifies the particular individual. For example, the first data may include the inferred identity information (e.g., indirect PI) of the particular individual and the second data may include PI of the particular individual. The device may combine the first data and a cryptographically random value to generate hashing input data. The random value may be generated using a cryptographically secure generator. In some examples, the cryptographically random value may be at least 512 bits in length.

The device may perform, using a hashing algorithm, a hashing operation on the hashing input data to generate de-identified first data. In some examples, the hashing operation may be performed using a Secure Hash Algorithm (SHA) algorithm. For instance, the SHA algorithm may be a Secure Hash Algorithm 512 (SHA-512) algorithm. Re-identification of the de-identified first data may require knowledge of at least the first data, the cryptographically random value, and the de-identified first data.

By using the cryptographically random value and the hashing algorithm to de-identify the first data as described herein, the device may preserve computer resources, network resources, and other resources that would have been use to take the remedial actions to restore and maintain the referential integrity as discussed above.

FIGS. 1A-1I are diagrams of an example associated with de-identifying data using a combination of cryptographic techniques. As shown in FIG. 1A, example 100 includes a user device 105, a de-identification platform 110, a first data structure 115, a second data structure 120, an aggregation data structure 125, and a random value data structure 130. User device 105 may include one or more devices capable of receiving, generating, storing, processing, and/or providing information associated with de-identifying data. User device 105 may be a device of a particular individual. In some instances, user device 105 may provide data (with consent of the particular individual) that may be de-identified, as described herein.

User device 105 may include a communication device and/or a computing device. For example, user device 105 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

De-identification platform 110 may include one or more devices capable of receiving, generating, storing, processing, providing, and/or routing de-identified data of different individuals (including the particular individual). De-identification platform 110 may include a communication device and/or a computing device. For example, de-identification platform 110 may include a server, such as an application server, a client server, a web server, a database server, a host server, a proxy server, a virtual server (e.g., executing on computing hardware), or a server in a cloud computing system. In some implementations, de-identification platform 110 includes computing hardware used in a cloud computing environment.

First data structure 115 may include a data structure (e.g., a database, a table, and/or a linked list) that stores inferred identity information of the different individuals (including the particular individual) and first historical data associated with the different individuals. The inferred identity information and the first historical data may be provided by user devices of the different individuals based on receiving consent from the different individuals using the user devices.

In some examples, the inferred identity information of the particular individual may include information that alone may not be used to directly determine an identity of the particular individual. For instance, the inferred identity information of the particular individual may include a place of birth of the particular individual, a date of birth of the particular individual, a business telephone number of the particular individual, a race of the particular individual, among other examples. In some examples, the first historical data associated with the particular individual may include historical data regarding one or more historical purchases made using user device 105. For instance, the one or more historical purchases may include one or more historical purchases of venue tickets.

In some implementations, the inferred identity information and the first historical data (hereinafter referred to collectively as "first data") may be encrypted prior to being stored in first data structure 115. For example, the first data may be encrypted using a cryptographic key that is based on a data classification level of the first data. For instance, one cryptographic key may be used per data classification level up to data classified as confidential. In other words, a single key may be shared amongst all data sources at a particular data classification level.

In some implementations, access to the first data may be regulated based on whether an authorization, to access the first data, has not been received from the devices of the different users. For example, de-identification platform 110 and/or first data structure 115 may detect a request to access the first data of the particular individual. De-identification platform 110 and/or first data structure 115 may determine whether an authorization, to access the first data of the particular individual, has been received (e.g., from user device 105, from another device associated with the particular individual, and/or from a device associated with de-identification platform 110 and/or first data structure 115).

In some instances, the authorization may identify particular devices and/or particular users that are authorized to access the first data. Alternatively, the authorization may be a general consent for the first data to be accessed. If first data structure 115 (and/or a device associated with first data structure 115) determines that the authorization has not been received, first data structure 115 may deny access to the first data. Alternatively, if first data structure 115 (and/or a device associated with first data structure 115) determines that the authorization has been received, de-identification platform 110 and/or first data structure 115 may authorize access to the first data (e.g., based on whether a device seeking access has been identified in the authorization). De-identification platform 110 may be configured to remove any capability of using the first data to identify an individual that has not provided consent, while preserving referential integrity of data stored in first data structure 115.

In some examples, first data structure 115 may be implemented on one or more devices capable of receiving, generating, storing, processing, and/or providing the inferred identity information of the different individuals and the first historical data associated with the different individuals. The one or more devices may include a communication device and/or a computing device.

For example, the one or more devices may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The one or more devices may communicate with one or more other devices of example 100, as described elsewhere herein.

Second data structure 120 may include a data structure (e.g., a database, a table, and/or a linked list) that stores the inferred identity information of different individuals (including the particular individual) and second historical data associated with the different individuals. The inferred identity information and the first historical data are provided by the user devices of the different individuals based on receiving consent from the different individuals using the user devices.

In some examples, the second historical data associated with the particular individual may include historical data regarding one or more historical reservations made using user device 105. In some examples, second data structure 120 may be implemented on one or more devices similar to the one or more devices described above in connection with first data structure 115.

In some implementations, the inferred identity information and the second historical data (hereinafter referred to collectively as "second data") may be encrypted prior to being stored in second data structure 120, in a manner similar to the manner described above in connection with first data structure 115. In some implementations, access to the second data may be regulated in a manner similar to the manner described above in connection with access to the first data.

The first historical data and the second historical data are merely provided as examples. In practice, different historical data may be used in different situations. For example, the different historical data may include historical data regarding historical browsing information of the user devices of the different individuals (e.g., online browsing), historical demographic data of the different individuals, historical data regarding dinner reservations (e.g., at the venues), historical purchases at the venues, among other examples of historical data obtained from the user devices based on receiving consent from the different individuals using the user devices.

Aggregation data structure 125 may include a data structure (e.g., a database, a table, and/or a linked list) that stores de-identified data of the different individuals (e.g., previously linked to the different individuals). For example, aggregation data structure 125 may store de-identified first data generated as a result of de-identification platform 110 de-identifying the first data and de-identified second data generated as a result of de-identification platform 110 de-identifying the second data, as described herein. In other words, aggregation data structure 125 may aggregate data from multiple sources of data such as from first data structure 115, second data structure 120, among other examples. In some examples, aggregation data structure 125 may be implemented on one or more devices similar to the one or more devices described above in connection with first data structure 115.

Random value data structure 130 may include a data structure (e.g., a database, a table, and/or a linked list) that stores a cryptographically random value. De-identification platform 110 may use the cryptographically random value to de-identify the first data and the second data. In some implementations, the cryptographically random value may be generated using a cryptographically secure generator (e.g., a true random number generator, a cryptographically secure number generator, or a cryptographic number generator). In some examples, the cryptographically secure generator may use entropy obtained from a source with a measure of quality that satisfies a quality threshold, such as an operating system associated with de-identification platform 110 and/or another device.

In some examples, the cryptographically secure generator may include an indirection, shift, accumulate, add, and count (ISAAC); the Yarrow algorithm; the Fortuna algorithm; the ChaCha20 algorithm; among other examples. The cryptographically random value may be added to base data (e.g., before the hashing operation). The cryptographically random value may include at least 512 bits of data randomly generated using the cryptographically secure generator. The quantity of bits of data of the cryptographically random value is merely provided as an example. In practice, different quantities of bits of data may be used in different situations.

In some implementations, de-identification platform 110 may generate the cryptographically random value and provide the cryptographically random value to random value data structure 130 for storage. Additionally, or alternatively, another device may generate the cryptographically random value and provide the cryptographically random value to random value data structure 130 for storage. The other device may include an administrator device of an administrator of first data structure 115, second data structure 120, aggregation data structure 125, and/or de-identification platform 110.

In some implementations, the cryptographically random value may be encrypted to generate an encrypted cryptographically random value and the encrypted cryptographically random value may be stored in random value data structure 130. For example, de-identification platform 110 and/or the administrator device may cause the cryptographically random value to be encrypted using one or more encryption techniques (e.g., symmetric encryption techniques) such as a an Advanced Encryption Standard (AES) algorithm or stronger. In some situations, access to the cryptographically random value may be restricted to de-identification platform 110. In other words, de-identification platform 110 may be authorized to access the cryptographically random value while other devices may be unauthorized to access the cryptographically random value.

In the example that follows, de-identification platform 110 may receive a data migration request to migrate the first data (e.g., a portion or an entirety of the first data) from first data structure 115 to aggregation data structure 125 and migrate the second data (e.g., a portion or an entirety of the second data) from second data structure 120 to aggregation data structure 125. In some examples, the data migration request may be received from the administrator device. Further assume that de-identification platform 110 is to de-identify the first data and the second data prior the first data and the second data being stored in aggregation data structure 125.

Figure 1B:
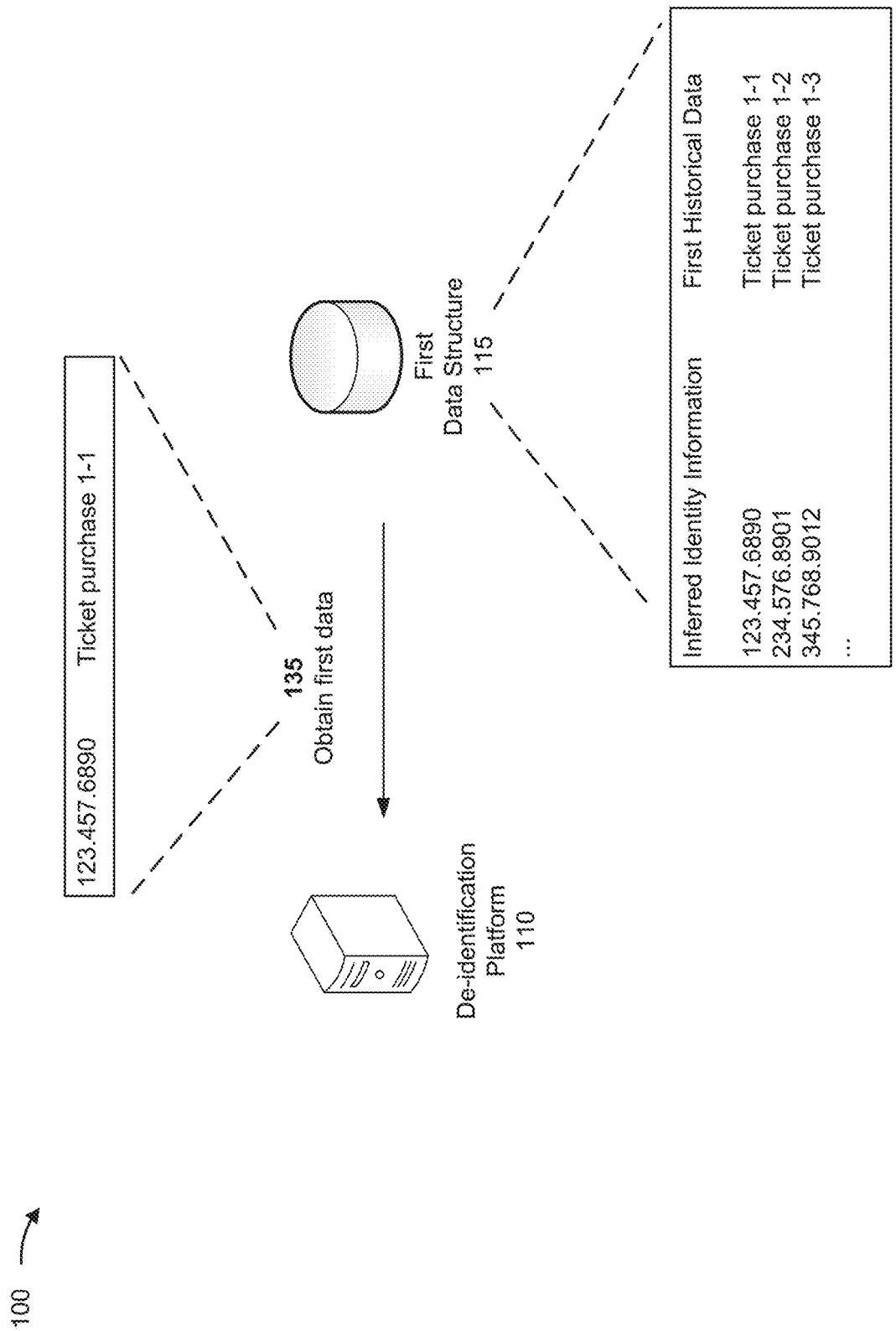

As shown in FIG. 1B, and by reference number 135, de-identification platform 110 may obtain the first data. For example, de-identification platform 110 may obtain the first data from first data structure 115. In some implementations, the data migration request may include the inferred identity information of the particular individual. Additionally, or alternatively, the data migration request may include information regarding one or more purchases. Based on receiving the data migration request, de-identification platform 110 may provide, to first data structure 115, a first data request that includes the information included the data migration request.

Based on providing the first data request, de-identification platform 110 may receive the first data from first data structure 115. In some examples, the first data may include the first data of the particular individual. The first data may include the inferred identity information of the particular individual and the first historical data (previously provided by user device 105). As shown in FIG. 1B, for example, the inferred identity information of the particular individual may include a business telephone number and the first historical data may include information regarding a venue ticket purchase. The information regarding the venue ticket purchase may include information identifying a name of the venue, a location of the venue, a quantity of tickets purchased, among other examples of information regarding the venue ticket purchase.

Figure 1C:
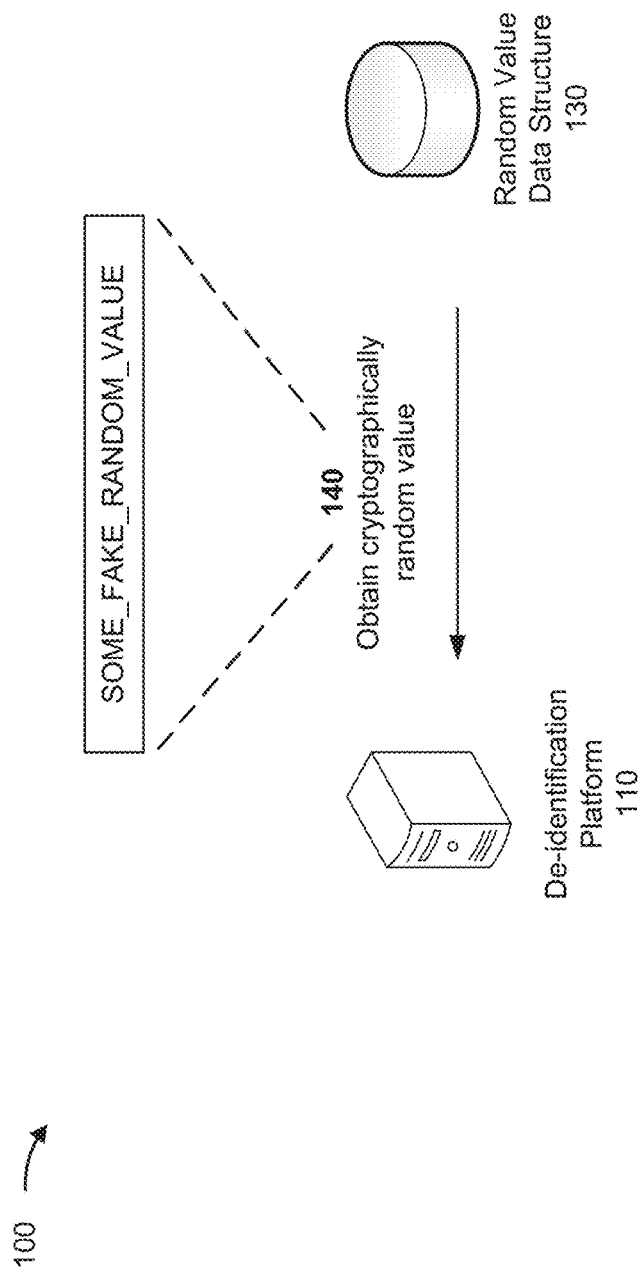

As shown in FIG. 1C, and by reference number 140, de-identification platform 110 may obtain the cryptographically random value. For example, de-identification platform 110 may obtain the cryptographically random value from random value data structure 130. In some implementations, based on receiving the data migration request, de-identification platform 110 may determine that the first data is to be de-identified as part of the process of migrating the first data from first data structure 115 to aggregation data structure 125. De-identification platform 110 may determine the first data is to be de-identified using the cryptographically random value. Accordingly, de-identification platform 110 may provide a cryptographically random value request to random value data structure 130 and may obtain the cryptographically random value from random value data structure 130 based on the random value request. De-identification platform 110 may use the cryptographically random value to de-identify the first data, as described below.

Figure 1D:
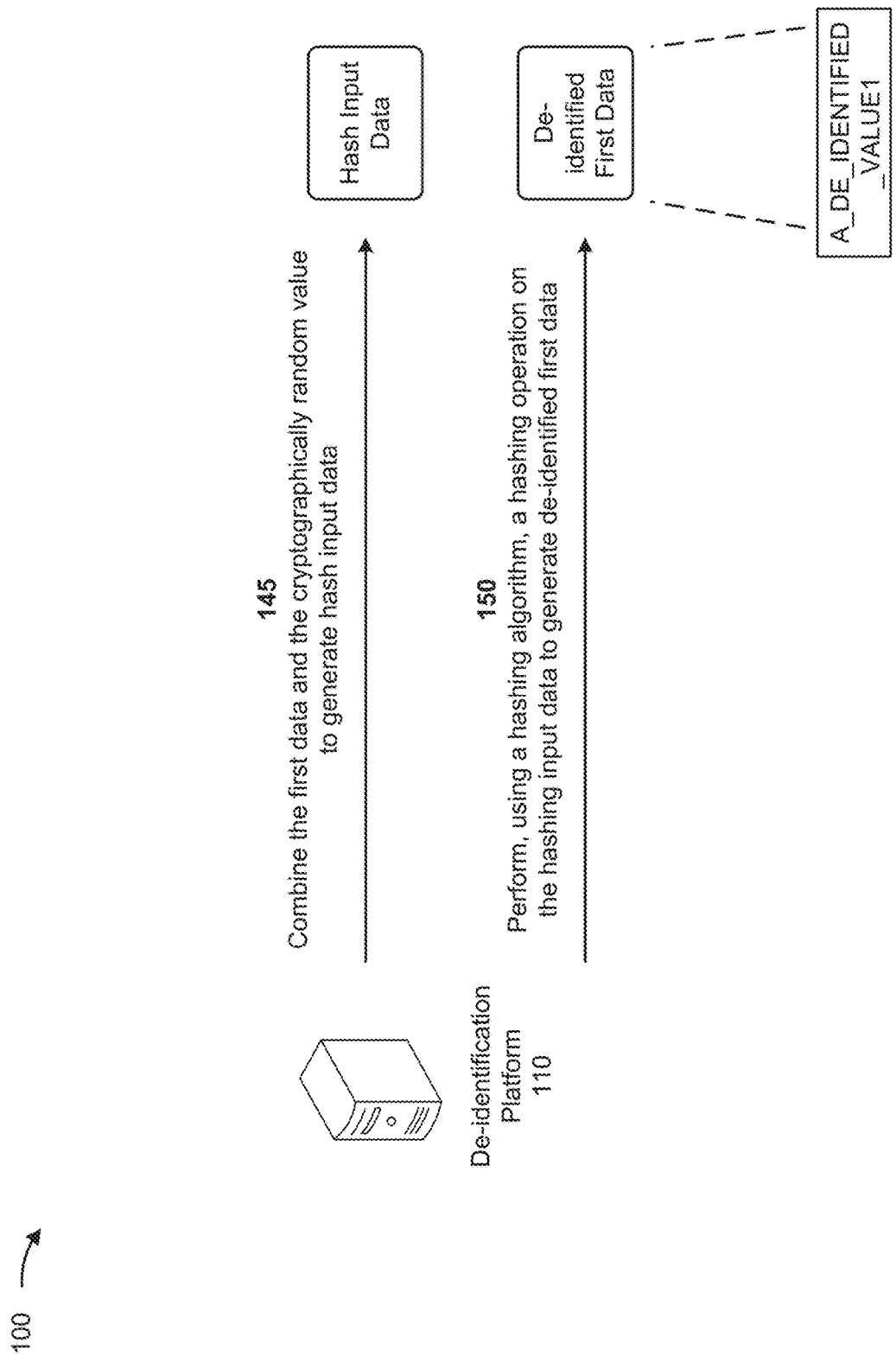

As shown in FIG. 1D, and by reference number 145, de-identification platform 110 may combine the first data and the cryptographically random value to generate hash input data. In some implementations, the first data may be encrypted, as described above. In this regard, in some situations, prior to combining to the first data and the cryptographically random value, de-identification platform 110 may decrypt the first data using one or more cryptographic keys (e.g., one or more key management service (KMS) keys) to generate decrypted first data.

In some implementations, the cryptographically random value may be encrypted as the encrypted cryptographically random value, as described above. In this regard, prior to combining to the first data and the cryptographically random value, de-identification platform 110 may obtain the encrypted cryptographically random value from random value data structure 130 and decrypt the encrypted cryptographically random value using one or more cryptographic keys (e.g., one or more KMS keys) to generate a decrypted cryptographically random value. Accordingly, de-identification platform 110 may combine the decrypted first data and the decrypted cryptographically random value to generate the hash input data.

In some examples, when combining the first data (e.g., the decrypted first data) and the cryptographically random value (e.g., the decrypted cryptographically random value), de-identification platform 110 may concatenate the cryptographically random value and the first data to generate the hash input data. Concatenating the cryptographically random value and the first data is merely provided as an example. In practice, the cryptographically random value and the first data may be combined in different ways in different situations.

In some implementations, when combining the first data and the cryptographically random value, de-identification platform 110 may combine the inferred identity information and the cryptographically random value to generate the hash input data. For example, de-identification platform 110 may combine the inferred identity information and the cryptographically random value, without including the first historical data to enable use of the first historical data for data analytics, as described in more details below.

As shown in FIG. 1D, and by reference number 150, de-identification platform 110 may perform, using a hashing algorithm, a hashing operation on the hashing input data to generate de-identified first data. In some implementations, when performing the hashing operation, de-identification platform 110 may perform the hashing operation, on the hashing input data, using a Secure Hash Algorithm (SHA) algorithm. For example, de-identification platform 110 may perform the hashing operation, on the hashing input data, using a Secure Hash Algorithm 512 (SHA-512) algorithm to generate the de-identified first data.

Based on the foregoing, de-identification platform 110 may de-identify the first data using a de-identification function $f$. The de-identification $f$ may be as follows:

$$f \equiv SHA_{512}(PI_{clear}, \beta)$$

where $SHA_{512}$ represents the SHA-512 algorithm, $PI_{clear}$ represents the first data (e.g., the inferred identity information), and $\beta$ represents the cryptographically random value.

In this regard, re-identification of the de-identified first data requires knowledge of at least the first data, the cryptographically random value, and the de-identified first data. Accordingly, by generating the de-identified first data in this manner may prevent (or reduce) a likelihood of an unauthorized party determining the identity of the particular individual. The SHA algorithm is merely provided as an example. In practice, different algorithms may be used in different situations.

De-identifying the first data in this manner preserves computer resources, network resources, and other resources that would have been used to take remedial actions as a result of the first data being improperly de-identified. The remedial actions may include attempting to recover and prevent use of the inferred identity information, reconfiguring a storage device that stores the inferred identity information to prevent unauthorized access to the storage device, identifying additional and/or different encryption techniques for de-identifying the inferred identity information, using the additional and/or different techniques to de-identify the inferred identity information, performing a data security and a network security audit, among other examples.

Figure 1E:
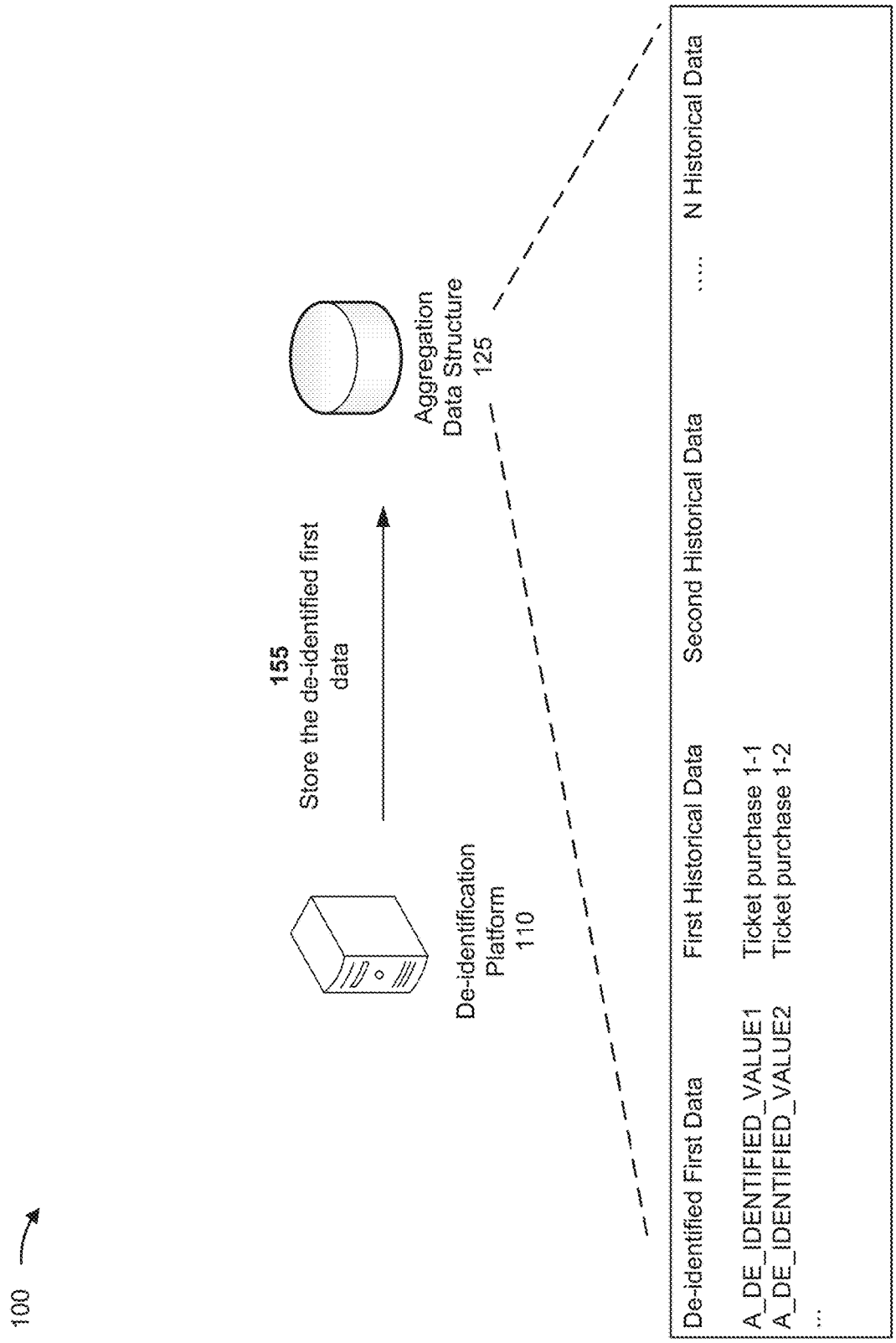

As shown in FIG. 1E, and by reference number 155, de-identification platform 110 may store the de-identified first data. For example, de-identification platform 110 may store the de-identified first data in aggregation data structure 125. As described above, in some implementations, the de-identified first data may be generated based on a combination of the cryptographically random value and the inferred identity information (e.g., without the first historical data). In this regard, the first historical data may be stored in association with the de-identified first data to enable the first historical data to be used to determine a recommendation for the particular individual.

As shown in FIG. 1E, the de-identified data of the particular individual may be stored in association with the first historical data of the particular individual. As shown in FIG. 1E, aggregation data structure 125 may store the de-identified data of one or more individuals in association with the first historical data of the one or more individuals.

Figure 1F:
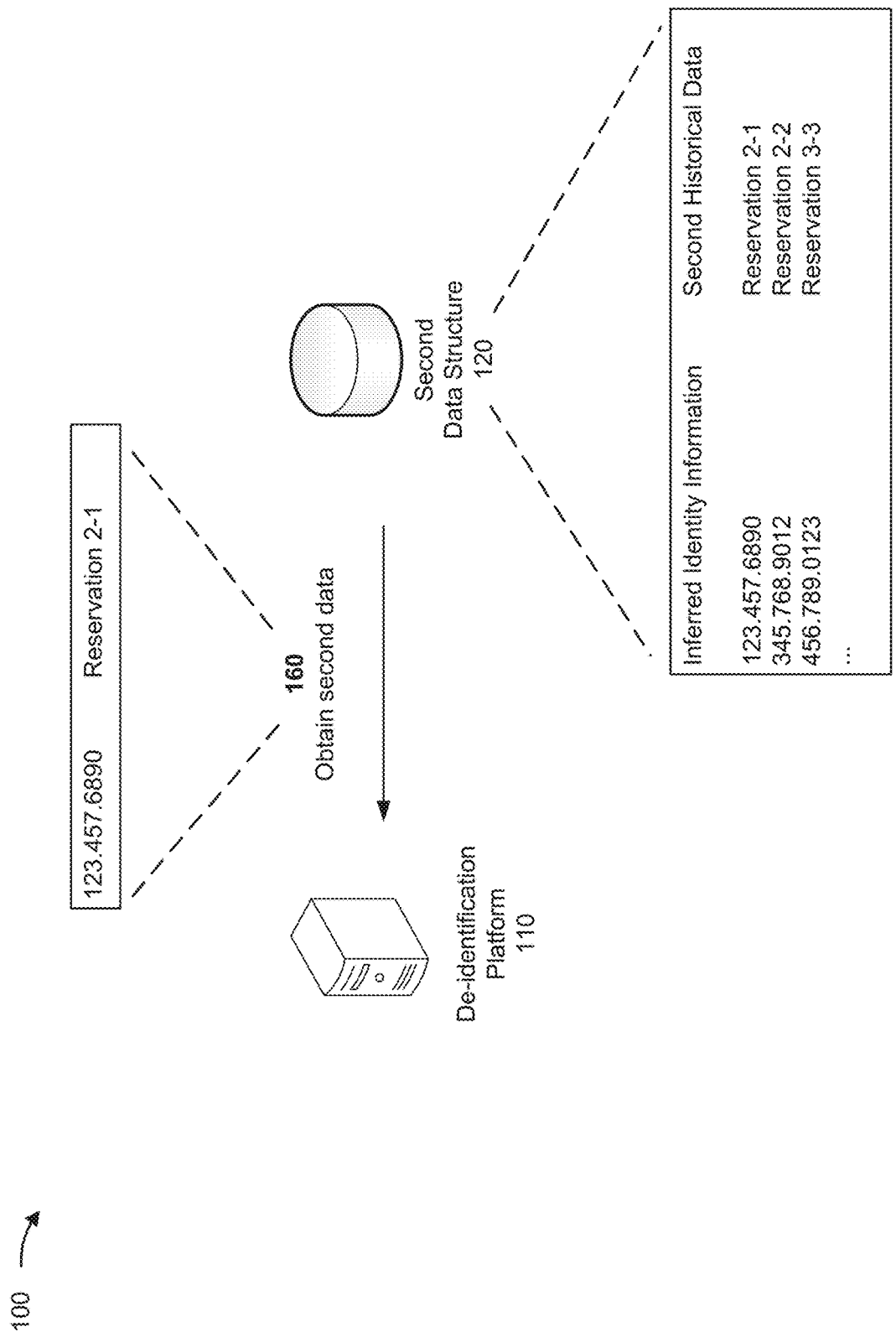

As shown in FIG. 1F, and by reference number 160, de-identification platform 110 may obtain the second data (e.g., from second data structure 120). In some implementations, de-identification platform 110 may obtain the second data from second data structure 120 in a manner similar to the manner described above in connection with obtaining the first data from first data structure 115. The second data may include inferred identity information of the particular individual and second historical data associated with the particular individual.

As shown in FIG. 1F, in some examples, the second data may include the inferred identity information included in the first data obtained from first data structure 115. As shown in FIG. 1F, the second historical data may include information regarding a reservation (e.g., dining, lodging, among other examples). The information regarding the reservation may include information identifying a location of the reservation, a name of an establishment associated with the reservation, a quantity of accommodation items (e.g., tables, rooms, among other examples), among examples of information regarding the reservation.

Figure 1G:
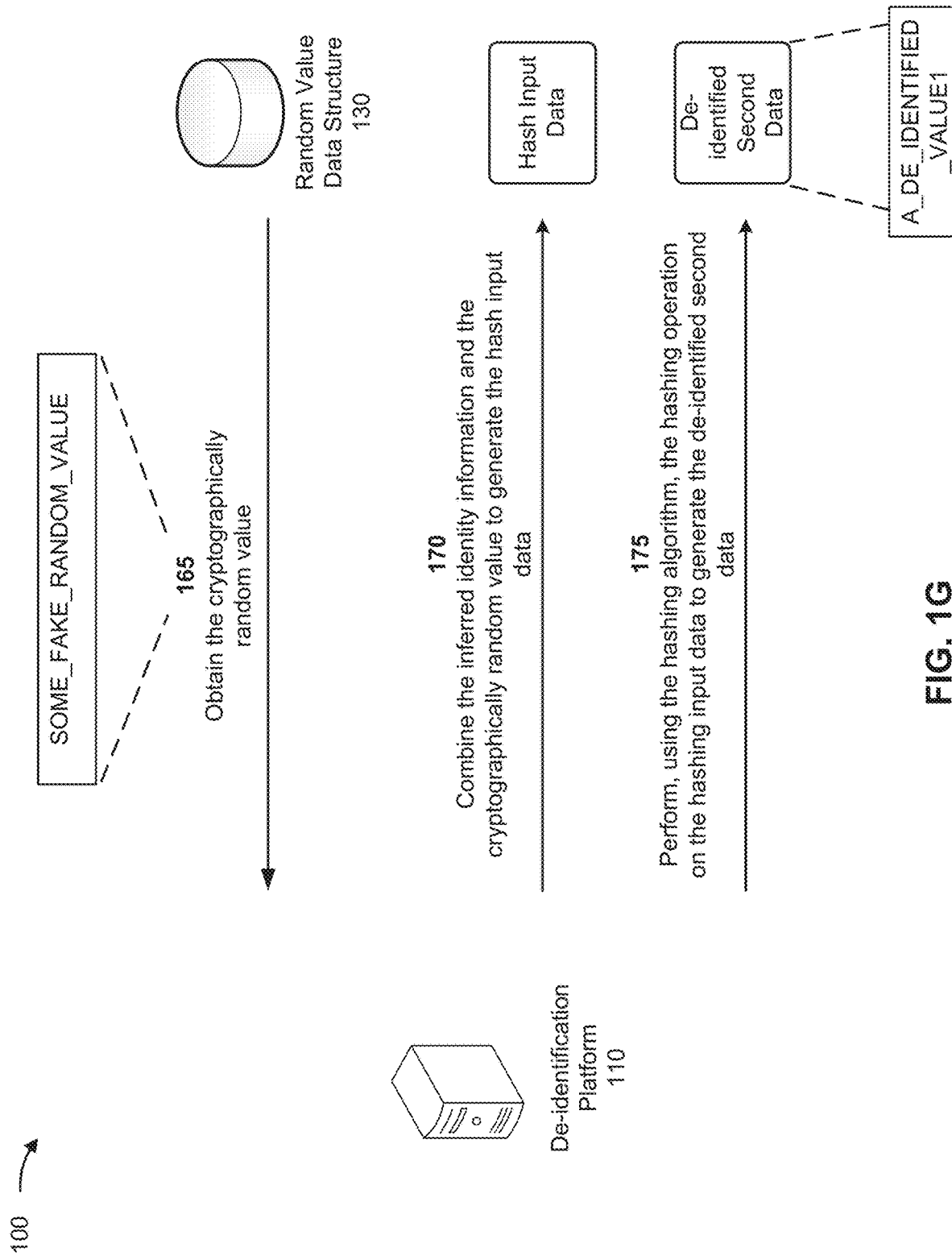

As shown in FIG. 1G, and by reference number 165, de-identification platform 110 may obtain the cryptographically random value. For example, de-identification platform 110 may obtain the cryptographically random value from random value data structure 130, in a manner similar to the manner described above in connection with obtaining the cryptographically random value.

As shown in FIG. 1G, and by reference number 170, de-identification platform 110 may obtain combine the inferred identity information and the cryptographically random value to generate the hash input data. For example, de-identification platform 110 may obtain combine the inferred identity information and the cryptographically random value in a manner similar to the manner describe above in connection combining the inferred identity information and the cryptographically random value. In some examples, because the inferred identity information is same as the inferred identity information (included in the first day) and the cryptographically random value is same as the cryptographically random value, the hash input data may be same as the hash input data generated above in connection with the first data.

As shown in FIG. 1G, and by reference number 175, de-identification platform 110 may perform, using the hashing algorithm, the hashing operation on the hashing input data to generate the de-identified second data. For example, de-identification platform 110 may perform the hashing operation on the hashing input to generate the de-identified second data, in a manner similar to the manner in which the de-identified first data is generated. In some examples, because the hash input data may be same as the hash input data, the de-identified second data may be same as the de-identified first data.

Figure 1H:
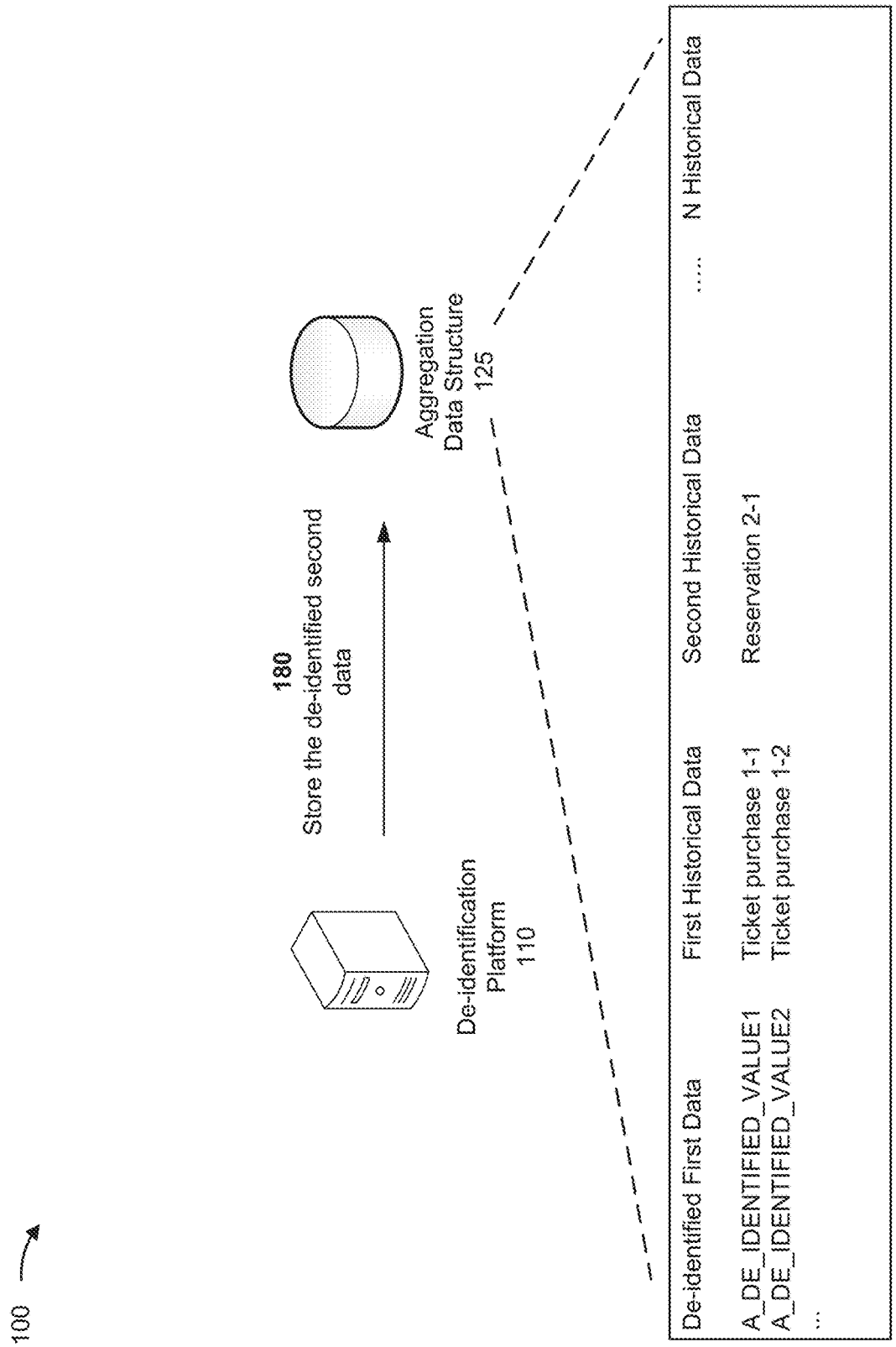

As shown in FIG. 1H, and by reference number 180, de-identification platform 110 may store the de-identified second data. For example, de-identification platform 110 may store the de-identified second data in aggregation data structure 125, in a manner similar to the manner described above in connection with storing the de-identified first data. In some implementations, de-identification platform 110 may determine that the de-identified second data is same as the de-identified first data. Accordingly, de-identification platform 110 may store the second historical data in association with the first historical data, which is stored in association with the de-identified first data. By storing the second historical data in this manner, de-identification platform 110 may cause the second historical data to be analyzed in conjunction with the first historical data to determine a recommendation for the particular individual and/o one or more individuals, as described below.

As shown in FIG. 1I, and by reference number 185, de-identification platform 110 may provide an instruction to cause an action to be performed. For example, de-identification platform 110 may provide an instruction, to user device 105, to cause the action to be performed as result of causing the second historical data to be analyzed in conjunction with the first historical data. In some implementations, de-identification platform 110 may process the first historical data and the second historical data, using a machine learning model, to determine a recommendation for the particular individual. For example, the machine learning model may be trained to determine a recommendation based on the first historical data and the second historical data.

The recommendation may include a recommendation regarding a restaurant, a souvenir store, a hotel for an upcoming vacation, another venue, among other examples. The machine learning model may be trained using historical data such as historical data regarding venue ticket purchases, historical data regarding purchases at venues, historical data regarding reservations, historical data regarding other types of purchases, historical data regarding browsing activities (e.g., online browsing activities), historical demographic data, among other examples.

The machine learning model may be trained as described in more detail below in connection with FIG. 2. In some examples, de-identification platform 110 may train the machine learning model. Additionally, or alternatively, a different device may generate and train the machine learning model.

De-identification platform 110 may cause the recommendation to be provided to a device. For example, de-identification platform 110 may cause the recommendation to be provided to user device 105. In some examples, the recommendation may include an instruction to cause user device 105 to display the recommendation.

De-identifying data, as described herein, preserves computer resources, network resources, and other resources that would have been used to take remedial actions to restore the referential integrity as discussed above.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
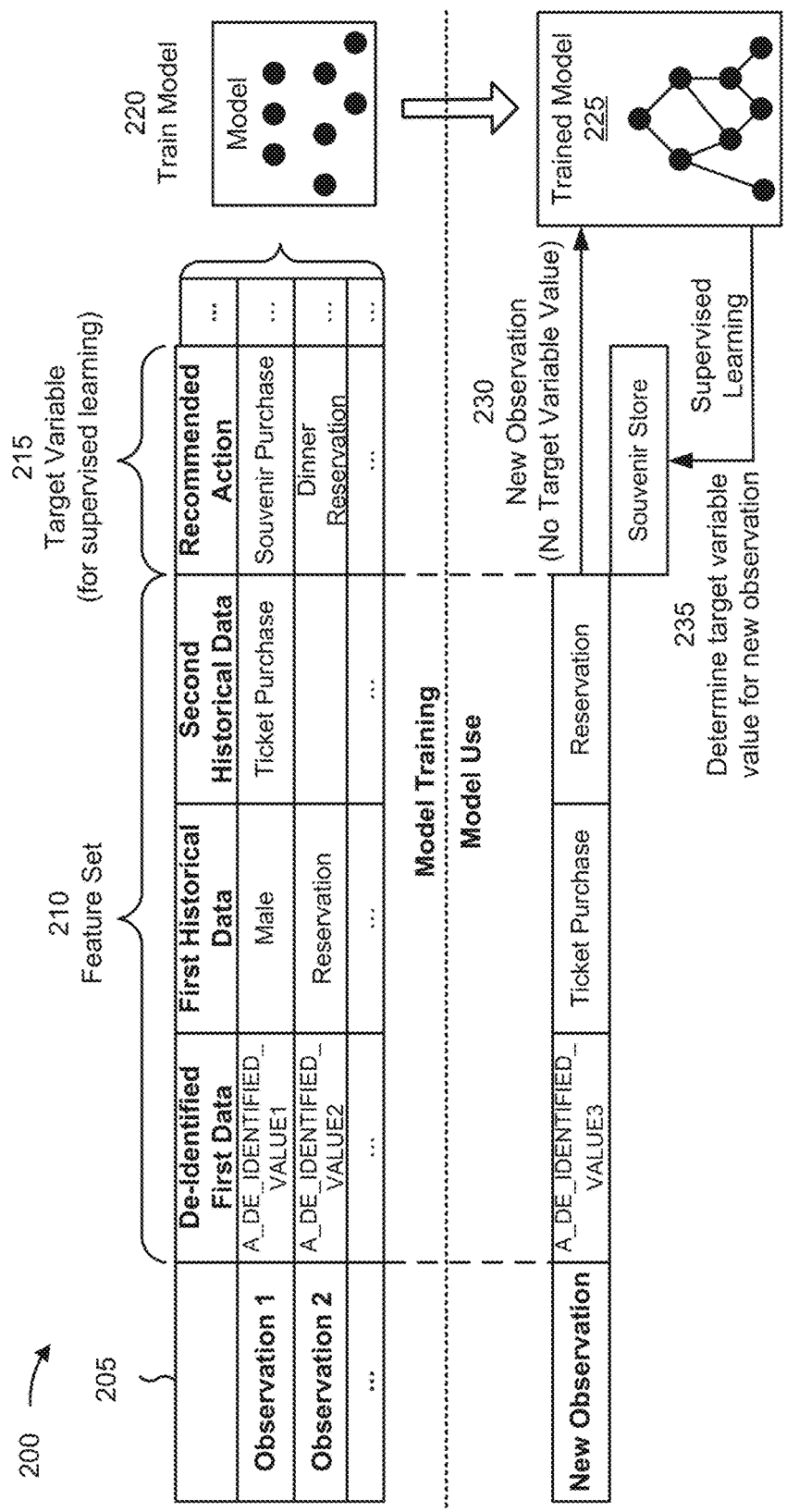
FIG. 2 is a diagram illustrating an example of training and using a machine learning model in connection with de-identifying data using a combination of cryptographic techniques.

FIG. 2 is a diagram illustrating an example 200 of training and using a machine learning model in connection with de-identifying data using a combination of cryptographic techniques. The machine learning model training and usage described herein may be performed using a machine learning system. The machine learning system may include or may be included in a computing device, a server, a cloud computing environment, or the like, such as de-identification platform 110 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from de-identification platform 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from de-identification platform 110. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of De-identified first data, a second feature of First historical data, a third feature of Second historical data, and so on. As shown, for a first observation, the first feature may have a value of A_DE_IDENTIFIED_VALUE1, the second feature may have a value of Male, the third feature may have a value of Ticket purchase, and so on. These features and feature values are provided as examples, and may differ in other examples. For example, the feature set may include one or more of the following features: features regarding venue purchases, restaurant reservations, purchases at other locations, browsing (e.g., online browsing).

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is Recommended action, which has a value of Souvenir purchase for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of A_DE_IDENTIFIED_VALUE3, a second feature of Ticket Purchase, a third feature of Reservation, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of Souvenir Store for the target variable of Recommended action for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to make a purchase at a souvenir store at the venue. The first automated action may include, for example, causing user device 105 to provide a recommendation to make a purchase at the souvenir store and/or provide a set of navigational directions to the souvenir store.

As another example, if the machine learning system were to predict a value of dinner reservation for the target variable of recommended action, then the machine learning system may provide a second (e.g., different) recommendation (e.g., a recommendation to make a dinner reservation) and/or may perform or cause performance of a second (e.g., different) automated action (e.g., automatically making the dinner reservation and/or providing a set of navigational directions to a restaurant associated with the dinner reservation).

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process associated with de-identifying data and providing recommendations. The machine learning system enables recognition and/or identification of tens, hundreds, thousands, or millions of features and/or feature values for tens, hundreds, thousands, or millions of observations, thereby increasing accuracy and consistency and reducing delay associated with de-identifying data and providing recommendations relative to requiring computing resources to be allocated for tens, hundreds, or thousands of operators to manually de-identifying data and providing recommendations using the features or feature values.

As indicated above, FIG. 2 is provided as an example. Other examples may differ from what is described in connection with FIG. 2.

Figure 3:
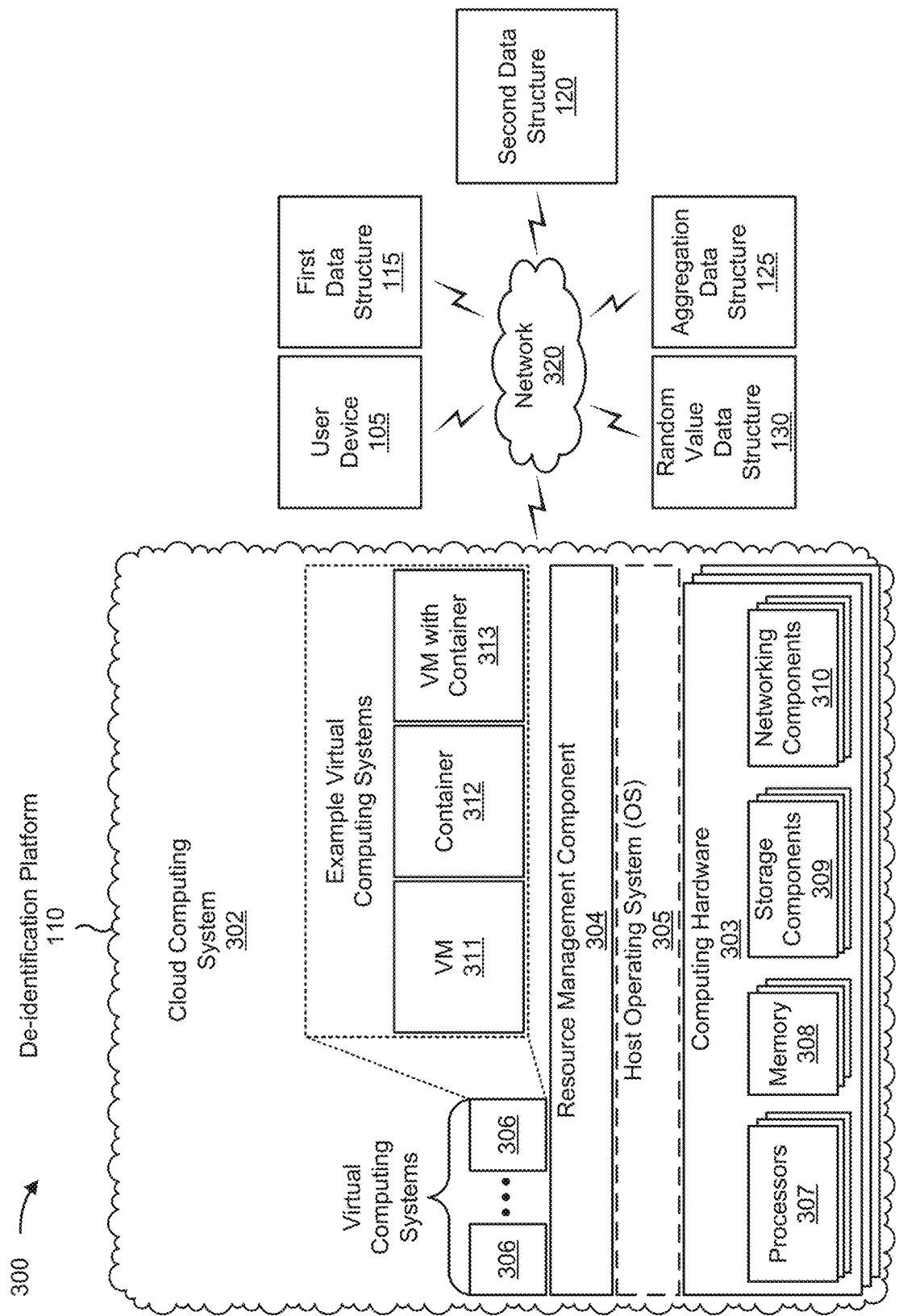
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a de-identification platform 110, which may include one or more elements of and/or may execute within a cloud computing system 302. The cloud computing system 302 may include one or more elements 303-313, as described in more detail below. As further shown in FIG. 3, environment 300 may include user device 105, first data structure 115, second data structure 120, aggregation data structure 125, random value data structure 130, and/or a network 320. Devices and/or elements of environment 300 may interconnect via wired connections and/or wireless connections. User device 105, first data structure 115, second data structure 120, aggregation data structure 125, and random value data structure 130 have been described above in connection with FIG. 1.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, or a hybrid environment 313 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the de-identification platform 110 may include one or more elements 303-313 of the cloud computing system 302, may execute within the cloud computing system 302, and/or may be hosted within the cloud computing system 302, in some implementations, the de-identification platform 110 may not be cloud-based (e.g., may be implemented outside of a cloud computing system) or may be partially cloud-based. For example, the de-identification platform 110 may include one or more devices that are not part of the cloud computing system 302, such as device 400 of FIG. 4, which may include a standalone server or another type of computing device. The de-identification platform 110 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
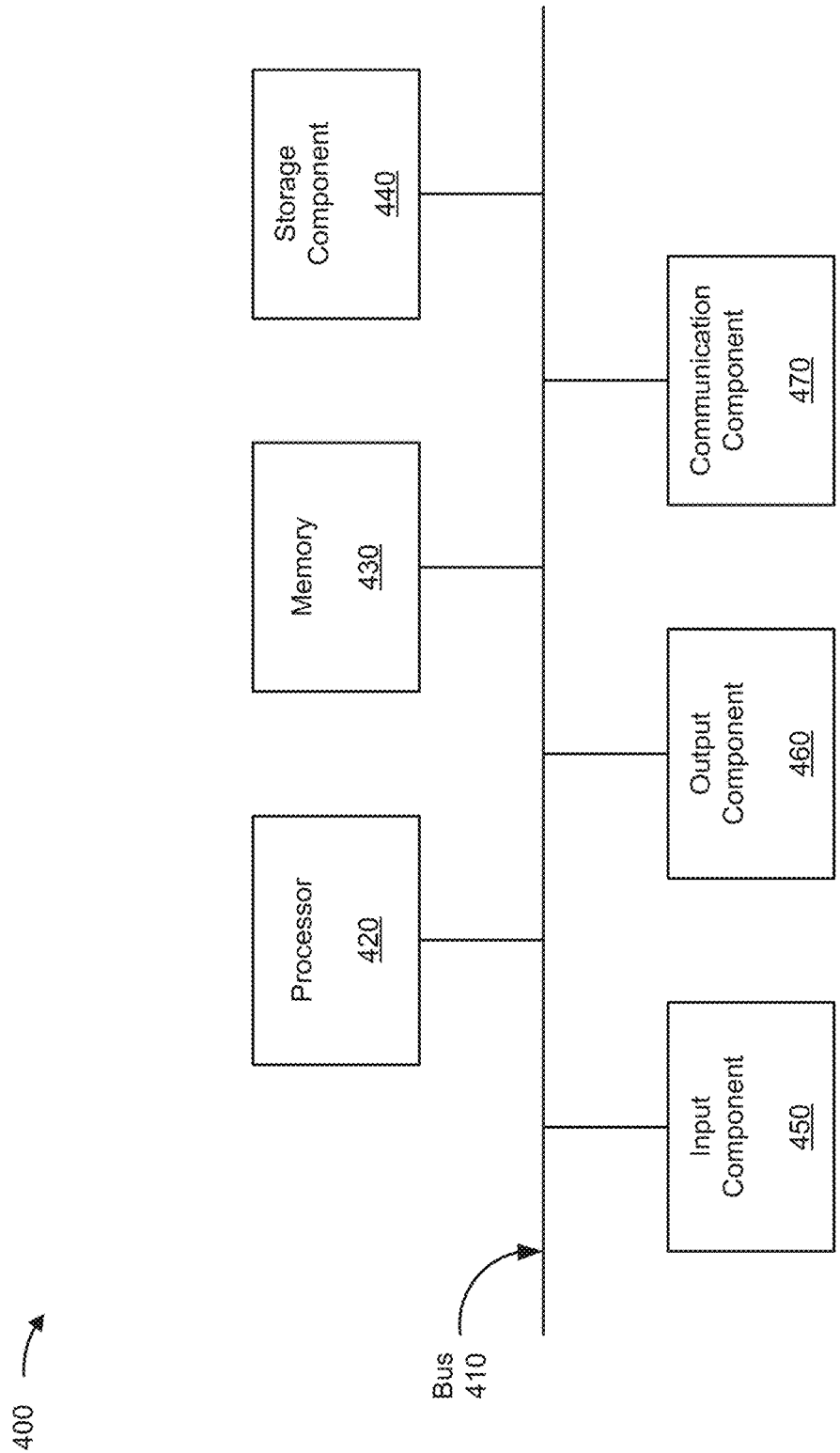
FIG. 4 is a diagram of example components of one or more devices of FIGS. 1 and 3.

FIG. 4 is a diagram of example components of one or more devices of FIGS. 1 and 3. The one or more devices may include a device 400, which may correspond to user device 105, de-identification platform 110, first data structure 115, second data structure 120, aggregation data structure 125, and/or random value data structure 130. In some implementations, user device 105, de-identification platform 110, first data structure 115, second data structure 120, aggregation data structure 125, and/or random value data structure 130 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hard-wired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
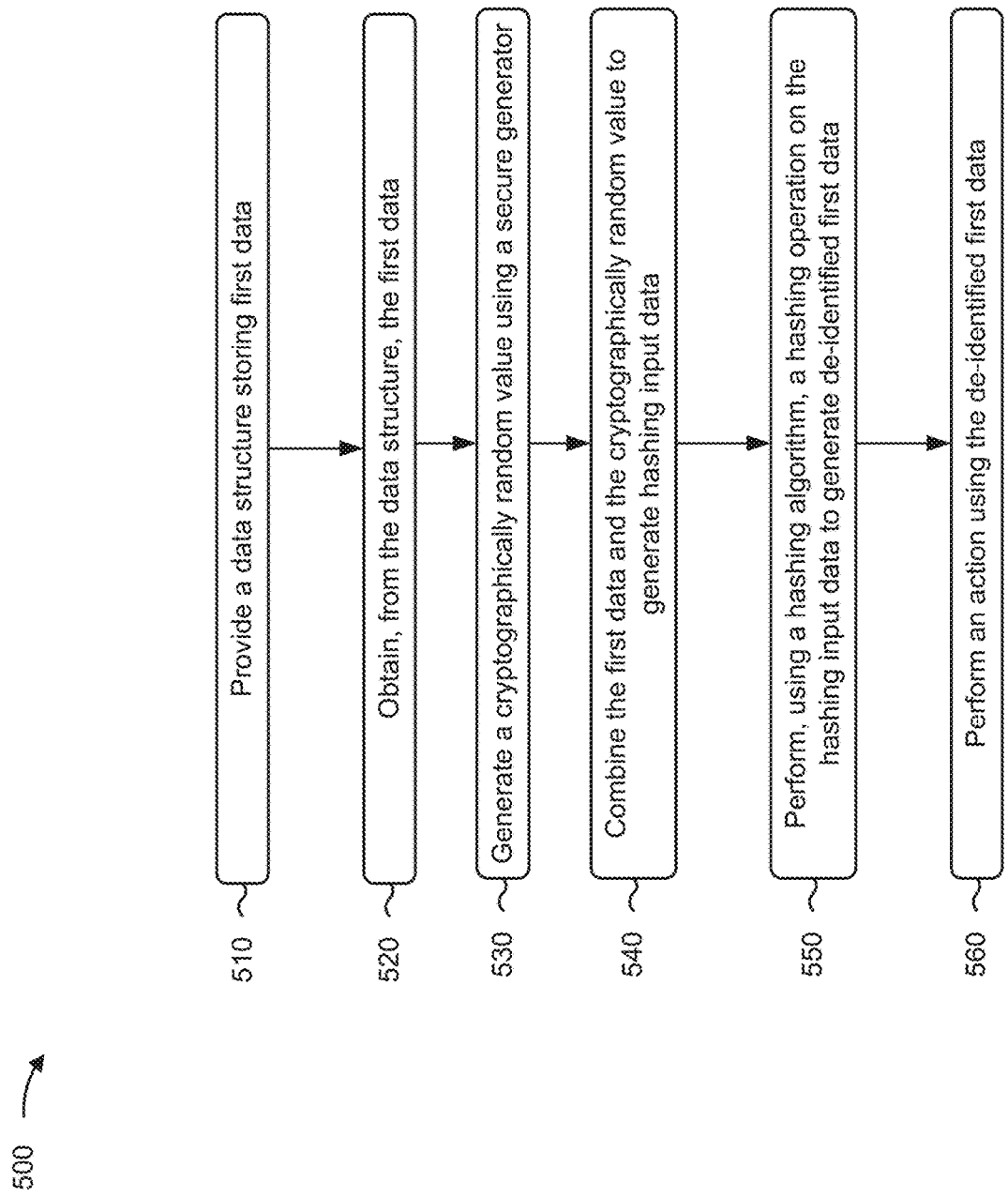
FIG. 5 is a flowchart of an example process associated with de-identifying data using a combination of cryptographic techniques.

FIG. 5 is a flowchart of an example process 500 associated with de-identifying data using a combination of cryptographic techniques. In some implementations, one or more process blocks of FIG. 5 may be performed by a de-identification platform 110 (e.g., de-identification platform 110). In some implementations, one or more process blocks of FIG. 5 may be performed by another device or a group of devices separate from or including the de-identification platform 110, such as user device 105 (e.g., user device 105), first data structure 115 (e.g., first data structure 115), second data structure 120 (e.g., second data structure 120), aggregation data structure 125 (e.g., aggregation data structure 125), and/or random value data structure 130 (e.g., random value data structure 130). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include providing a data structure storing first data, wherein the first data indirectly identifies second data, and wherein the second data identifies a particular individual (block 510). For example, the de-identification platform 110 may provide a data structure storing first data, wherein the first data indirectly identifies second data, and wherein the second data identifies a particular individual, as described above.

As further shown in FIG. 5, process 500 may include obtaining, from the data structure, the first data (block 520). For example, the de-identification platform 110 may obtain, from the data structure, the first data, as described above.

As further shown in FIG. 5, process 500 may include generating a cryptographically random value using a secure generator (block 530). For example, the de-identification platform 110 may generate a cryptographically random value using a secure generator, as described above.

In some implementations, generating the cryptographically random value comprises randomly generating at least 512 bits of data using the secure generator. In some implementations, the data structure is a first data structure, wherein the cryptographically random value is encrypted to generate an encrypted cryptographically random value that is randomly generated and the encrypted cryptographically random value is stored in a second data structure, and wherein combining the first data and the cryptographically random value comprises obtaining the encrypted cryptographically random value from the second data structure, decrypting the encrypted cryptographically random value to generate a decrypted cryptographically random value, and combining the first data and the decrypted cryptographically random value.

As further shown in FIG. 5, process 500 may include combining the first data and the random value to generate hashing input data (block 540). For example, the de-identification platform 110 may combine the first data and the cryptographically random value to generate hashing input data, as described above. In some implementations, combining the first data and the cryptographically random value comprises concatenating the random value and the first data.

As further shown in FIG. 5, process 500 may include performing, using a hashing algorithm, a hashing operation on the hashing input data to generate de-identified first data, wherein re-identification of the de-identified first data requires knowledge of at least the first data, the random value, and the de-identified first data (block 550). For example, the de-identification platform 110 may perform, using a hashing algorithm, a hashing operation on the hashing input data to generate de-identified first data, wherein re-identification of the de-identified first data requires knowledge of at least the first data, the cryptographically random value, and the de-identified first data, as described above. In some implementations, performing the hashing operation comprises performing the hashing operation, on the hashing input data, using a Secure Hash Algorithm (SHA) algorithm.

As further shown in FIG. 5, process 500 may include performing an action using the de-identified first data (block 560). For example, the de-identification platform 110 may perform an action using the de-identified first data, as described above.

In some implementations, the data structure is a first data structure, wherein the first data includes inferred identity information that indirectly identifies the particular individual and first historical data provided by a first device used by the particular individual, wherein combining the first data and the cryptographically random value comprises combining the inferred identity information and the cryptographically random value to generate the hashing input data, and wherein the method further comprises providing a second data structure storing third data, wherein the second data structure is different than the first data structure, wherein the third data includes the inferred identity information and second historical data provided by a second device used by the particular individual, receiving the third data from the second data structure, combining the inferred identity information and the cryptographically random value to generate the hashing input data, performing, using the hashing algorithm, the hashing operation on the hashing input data to generate the de-identified first data, and storing, in a third data structure, the de-identified first data in association with the first historical data and the second historical data, wherein the third data structure is different than the first data structure and the second data structure, and causing a recommendation to be provided to a third device based on the first historical data and the second historical data stored in association with the de-identified first data.

In some implementations, process 500 includes encrypting the first data prior to the first data being stored in the data structure, wherein the first data is encrypted by a cryptographic key that is based on a data classification level of the first data, and wherein, when the data classification level satisfies a classification level threshold, the first data is encrypted by cryptographic keys that are based on a source of the first data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a device, the method comprising:
    obtaining, from a first data structure, first data, wherein the first data includes interred identity information that indirectly identifies a particular individual and includes first historical data provided by a first device used by the particular individual;
    obtaining, from a second data structure, second data that includes the inferred identity information and second historical data provided by a second device used by the particular individual;
    generating a cryptographically random value using a secure generator;
    combining the inferred identity information and the cryptographically random value to generate hashing input data;
    performing, using a hashing algorithm, a hashing operation on the hashing input data to generate de-identified first data, wherein re-identification of the de-identified first data requires knowledge of at least the first data, the cryptographically random value, and the de-identified first data;

storing, in a third data structure, the de-identified first data in association with the first historical data and the second historical data; and causing a recommendation to be provided to a third device based on the first historical data and the second historical data stored in association with the de-identified first data.

2. The method of claim 1, wherein generating the cryptographically random value comprises:
randomly generating at least 512 bits of data using the secure generator.

3. The method of claim 1, wherein performing the hashing operation comprises:
performing the hashing operation, on the hashing input data, using a Secure Hash Algorithm (SHA) algorithm.

4. The method of claim 1, wherein combining the inferred identity information and the cryptographically random value comprises:
concatenating the cryptographically random value and the inferred identity information.

5. The method of claim 1,
wherein the cryptographically random value is encrypted to generate an encrypted cryptographically random value that is randomly generated and the encrypted cryptographically random value is stored in a fourth data structure; and
wherein combining the inferred identity information and the cryptographically random value comprises:
obtaining the encrypted cryptographically random value from the fourth data structure;
decrypting the encrypted cryptographically random value to generate a decrypted cryptographically random value; and
combining the inferred identity information and the decrypted cryptographically random value.

6. The method of claim 1, further comprising:
encrypting the first data prior to the first data being stored in the first data structure,
wherein the first data is encrypted by a cryptographic key that is based on a data classification level of the first data, and
wherein, when the data classification level satisfies a classification level threshold, the first data is encrypted by cryptographic keys that are based on a source of the first data.

7. A device, comprising:
a memory; and
one or more processors configured to:
obtain first data, wherein the first data includes inferred identity information that infers an identity of a particular individual and first historical data generated by a first device used by the particular individual;
obtain second data that includes the inferred identity information and second historical data generated by a second device used by the particular individual;
obtain a cryptographically random value generated using a secure generator;
perform, using a hashing algorithm, a hashing operation on a combination of the inferred identity information and the cryptographically random value to generate de-identified first data, wherein re-identification of the de-identified first data requires knowledge of at least the first data, the cryptographically random value, and the de-identified first data;

store, in a data structure, the de-identified first data in association with the first historical data and the second historical data; and cause a recommendation to be provided based on the first historical data and the second historical data stored in association with the de-identified first data.

8. The device of claim 7, wherein the one or more processors are further configured to:
concatenate the inferred identity information and the cryptographically random value to generate hashing input data.

9. The device of claim 8, wherein the one or more processors, to perform the hashing operation, are configured to:
perform the hashing operation, on the hashing input data, using a Secure Hash Algorithm (SHA) algorithm to generate the de-identified first data.

10. The device of claim 7, wherein the data structure is a first data structure,
wherein the cryptographically random value is encrypted to generate an encrypted random value;
wherein the encrypted random value is stored in a second data structure; and
wherein the one or more processors, to obtain the random value, are configured to:
obtain the encrypted random value from the second data structure; and
decrypt the encrypted random value to obtain a decrypted random value.

11. The device of claim 7, wherein the one or more processors are further configured to:
detect a request to access the first data;
determine that an authorization, to access the first data, has not been received from a device of the particular individual; and
deny access to the first data based on determining that the authorization, to access the first data, has not been received from the device of the particular individual.

12. The device of claim 7, wherein the cryptographically random value includes 512 bits of data randomly generated using the secure generator; and
wherein the one or more processors, to perform the hashing operation, are configured to:
perform the hashing operation, on the combination of the first data and the cryptographically random value, using a Secure Hash Algorithm 512 (SHA-512) algorithm to generate the de-identified first data.

13. The device of claim 8, wherein the cryptographically random value includes at least 512 bits of data randomly generated using the secure generator.

14. A non-transitory computer-readable medium storing a set of instructions, the set of instructions comprising:
one or more instructions that, when executed by one or more processors of a device, cause the device to:
obtain first data, wherein the first data includes inferred identity information that infers the identity of a particular individual and first historical data generated by a first device used by the particular individual;
obtain second data that includes the inferred identity information and second historical data generated by a second device used by the particular individual;
obtain a cryptographically random value generated using a cryptographically secure generator;

combine the inferred identity information and the cryptographically random value to generate hashing input data;
perform, using a hashing algorithm, a hashing operation on the hashing input data to generate de-identified first data;
store the de-identified first data in association with the first historical data and the second historical data; and
cause a recommendation to be provided based on the first historical data and the second historical data stored in association with the de-identified first data.

15. The non-transitory computer-readable medium of claim 14, wherein the one or more instructions, when executed by the one or more processors, further cause the device to:
cause the cryptographically random value to be randomly generated using the secure generator.

16. The non-transitory computer-readable medium of claim 14, wherein the cryptographically random value is encrypted to generate an encrypted cryptographically random value;
wherein the encrypted cryptographically random value is stored in a data structure; and
wherein the one or more instructions, that cause the device to obtain the random value, cause the device to:
obtain the encrypted cryptographically random value from the data structure; and
decrypt the encrypted cryptographically random value, obtained from the data structure, to obtain a decrypted cryptographically random value.

17. The non-transitory computer-readable medium of claim 14, wherein the one or more instructions further cause the device to:
encrypt the first data prior to the first data being stored,
wherein the first data is encrypted by a cryptographic key that is based on a data classification level of the first data, and
wherein, when the data classification level satisfies a classification level threshold, the first data is encrypted by cryptographic keys that are based on a source of the first data.

18. The non-transitory computer-readable medium of claim 14, wherein the one or more instructions, that cause the device to combine the inferred identity information and the cryptographically random value, cause the device to:
concatenate the inferred identity information and the cryptographically random value to generate the hashing input data.

19. The non-transitory computer-readable medium of claim 14, wherein the one or more instructions, that cause the device to perform the hashing operation, cause the device to:
perform the hashing operation, on the hashing input data, using a Secure Hash Algorithm 512 (SHA-512) to generate the de-identified first data.

20. The non-transitory computer-readable medium of claim 14, wherein the cryptographically random value includes at least 512 bits of data randomly generated using the cryptographically secure generator.

\* \* \* \* \*

UNITED STATES PATENT AND TRADEMARK OFFICE
CERTIFICATE OF CORRECTION

| | |
|---|---|
| PATENT NO. | : 12,019,763 B2 |
| APPLICATION NO. | : 17/456592 |
| DATED | : June 25, 2024 |
| INVENTOR(S) | : Matthew W. Yucha et al. |

Page 1 of 1

It is certified that error appears in the above-identified patent and that said Letters Patent is hereby corrected as shown below:

On the Title Page

Item (12), delete:
"Yuchas"
And insert:
-- Yucha --

Item (72), please correct the spelling of the last name of inventor:
"Matthew W. YUCHAS"
To read:
Matthew W. YUCHA Signed and Sealed this
Tenth Day of June, 2025

Coke Morgan Stewart
*Acting Director of the United States Patent and Trademark Office*